United States Patent [19]

Kraft

[11] Patent Number: 4,533,588
[45] Date of Patent: Aug. 6, 1985

[54] GROOVED PLASTIC BOARD AND METHOD OF MAKING SAME

[75] Inventor: Howard R. Kraft, St. Paul, Minn.

[73] Assignee: T. O. Plastics, Inc., Minneapolis, Minn.

[21] Appl. No.: 646,800

[22] Filed: Sep. 4, 1984

[51] Int. Cl.³ .......................... B32B 3/30; B32B 31/16
[52] U.S. Cl. .................................... 428/167; 156/222; 156/250; 156/309.6; 264/321; 428/172; 428/247; 428/255; 428/309.9; 428/313.5; 428/316.6
[58] Field of Search .................. 428/35, 36, 156, 157, 428/158, 159, 160, 167, 172, 247, 255, 309.9, 313.5, 316.6; 156/222, 250, 309.6; 264/321

[56] References Cited

U.S. PATENT DOCUMENTS

| 3,627,613 | 12/1971 | Stolki | 428/247 |
| 4,363,684 | 12/1982 | Hay, II | 428/316.6 |

FOREIGN PATENT DOCUMENTS

| 780177 | 3/1968 | Canada | 428/316.6 |
| 1146743 | 3/1969 | United Kingdom | 428/167 |

Primary Examiner—William J. Van Balen
Attorney, Agent, or Firm—Jacobson & Johnson

[57] ABSTRACT

A thin mesh is embedded in a relatively rigid molded plastic sheet which has cushioning and insulating characteristics with cutlines formed through the plastic to the mesh so that the sheet is separated into hingedly attached sections which can then be folded as desired to make containers or packages or the like. As an additional feature the plastic can be eliminated over certain areas on both sides of the mesh to provide a see-through opening.

14 Claims, 7 Drawing Figures

GROOVED PLASTIC BOARD AND METHOD OF MAKING SAME

FIELD OF THE INVENTION

Although this invention is directed primarily toward providing a product that is utilized to make containers and packaging with cushioning and insulating characteristics, it may have application to other areas of use such as for toys. However, the invention will be described herein as it is used for packaging.

DESCRIPTION OF THE PRIOR ART

In the packaging industry it has been the practice to use shock-absorbing somewhat rigid or stiff plastic foam members to place around an article in its shipping container, such as a cardboard box, to cushion it to prevent damage during delivery. These members usually are provided in two different forms. One is in the form of individual flat pieces made by molding each piece separately or by die cutting the pieces out of a slab or sheet of plastic foam. The pieces are then placed individually around the article and may be cemented or attached together in some other fashion and then the packaged article is placed in the shipping container. This requires that the fabricator of the protective material first make the separate pieces and then ship them to the packer who selects the proper pieces, puts them together in the right order and attaches them together around the article. The pieces must be made separate because the material is too stiff to fold or bend around an article. This invention provides means whereby the stiff plastic foam effectively becomes foldable. Another way is to mold the protective package in its desired end shape and then place the article inside the package which is then placed in the shipping container. There are a number of difficulties with this latter type of system. For one since generally the protective package is manufactured by a fabricator it has to be shipped to the packer or user. If it is in the package form as described above it is usually quite bulky and, therefore, costly to ship as compared to the first described system where all the pieces are flat and can be stacked for efficient shipping. A second problem is where the protective package has an internal boss or projection. This adds to the cost of the mold and to the cost of the molding operation because the mold cavity would have to be separated in order to remove the molded part or the parts would have to be made separately and then joined together.

A partial solution to the problems with the first described system has been to attach the individual flat members to a flat layer of some suitable flexible material which serves as a hinge connection so that the various pieces are kept together and folded into position to form the protective container. U.S. Pat. No. 1,645,765 dated Oct. 18, 1927 by McCree shows a product of this nature having two layers or pieces of material (which assumedly could be protective cushioning material) with a flexible woven fabric or cloth between the layers to provide a hinge connection. While the patent does not describe the manner in which the intermediate layer is attached to the two other separate layers it is assumed that it is done with some suitable adhesive. A drawback of this system is that it requires the steps of making separate pieces for the two separate layers and then adhesively attaching them to opposite sides of a separate layer. Another drawback is that since the end product is made up of individual layers there is the danger of the layers separating, especially as the adhesive deteriorates.

SUMMARY OF THE INVENTION

A slab or sheet of relatively stiff or rigid plastic material, preferably a shock-absorbing cushioning foam, has an embedded flat mesh to provide a hinging layer. The base material is molded into a unitary body by the material fusing together on each side of the mesh through the mesh openings so that the mesh is secured solidly in place and is made a part of the composite body during the molding operation. This eliminates the need for the steps of forming individual pieces, placing a hinging layer between the separate layers of these individual pieces and attaching them together in some fashion. In addition, by molding the plastic material so that it fuses together through the openings in the mesh there is no danger of separation of layers. Either during the molding process or afterwards elongated cutlines are formed through the plastic material down to the mesh so that the plastic sheet is separated into sections which are still hingedly joined to one another so that they can be folded with respect to one another to form the walls of a protective container. Initially the product is made in flat sheet or slab form which can be efficiently stored and shipped and can be later quickly and conveniently folded into the desired package as needed. In addition, if there is a need or desire to have an opening in the protective package for viewing its contents some of the plastic can be eliminated in an area on both sides of the mesh to provide a see-through opening without losing any support or protection for the contents and without substantially weakening the package.

DESCRIPTION OF THE PREFERRED EMBODIMENT

Figure 1:
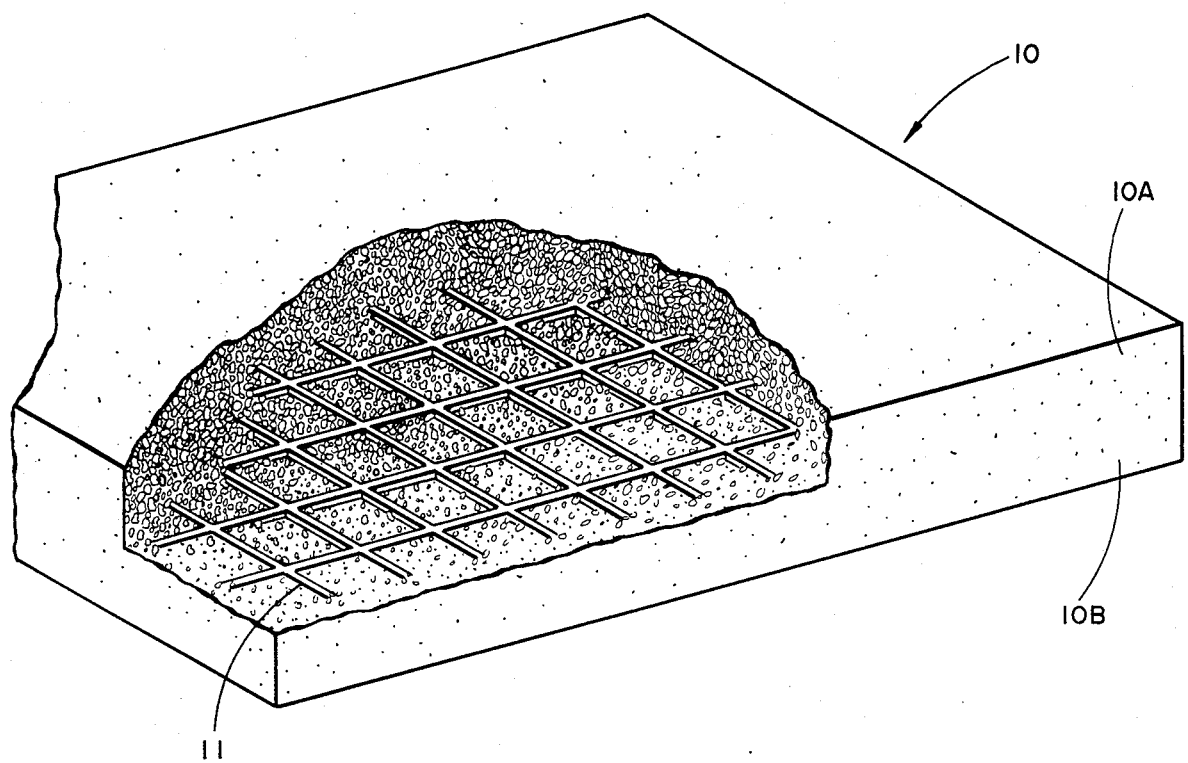
FIG. 1 is a break-away section view of the preferred embodiment of the invention illustrating in detail the molded form of the plastic sheet or slab.
Figure 2:
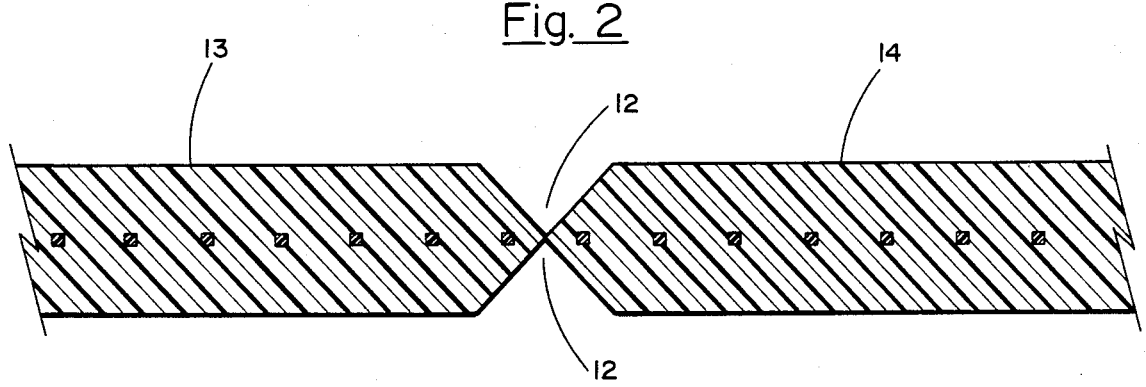
FIG. 2 shows overlying slots or grooves making the sheet into separate hingedly joined sections.

The base sheet or board or slab identified by reference numeral 10 is of unitary construction and is molded in the illustrated flat form using a suitable plastic material which has the desired characteristics. Preferably the material is expanded polystyrene foam (EPS) which has cushioning or shock-absorbing characteristics to serve the purpose of protective packaging although polyurethane foam or open cell polyethylene foam are examples of other usable materials. Embedded in the base plastic material between the top and bottom surfaces is a generally flat relatively thin bendable layer of mesh 11. Although the base material 10 is formed into a single integral body, for convenience and for purposes of explanation there may be reference from time to time to a top portion 10A and a bottom portion 10B. FIG. 1 illustrates how the top section 10A and the bottom section 10B are fused together through the openings in the mesh 11. The mesh 11 substantially retains its separate identity and is tenaciously held in place within the body 10 by virtue of the fusing of the upper and lower portions 10A and 10B. The body 10 can be formed in conventional fashion by first placing the mesh into a mold cavity then filling the remainder of the cavity with polystyrene beads. The bead size and mesh size are such to permit the beads to go through the mesh openings. In a conventional fashion hot steam that is used to expand the polystyrene beads in the mold passes through the mesh openings and causes the beads to flow and fuse together through the mesh openings and around the mesh lines which define the mesh openings thereby embedding the mesh solidly within the base plastic material.

Figure 3:
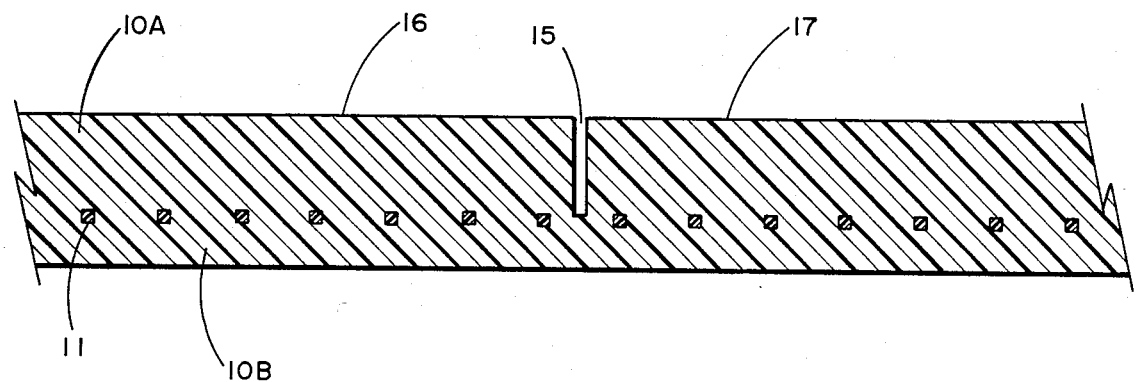
FIG. 3 illustrates an embodiment having a cutline or groove from only one surface of the sheet.

Either during molding or by use of suitable dies, hot wires or other cutting devices after molding, grooves or slots 12 are formed as desired or as required through the top 10A and bottom 10B portions of the base material in an overlaying relationship down to the web 11. For example, if the sheet were rectangular, grooves 12 extending from one side edge to the other would cut the sheet into two separate pieces which would still be hingedly attached to one another. If, for example, a sheet is to be made into a square box with top and bottom, then a series of slots or grooves 12 would be made in the sheet to form it into the required number of equal dimensioned sections to provide the separate hinged-together pieces. The separate sections, such as 13 and 14, can then be folded along the slots 12 to form the walls of a container with the pieces held together by the mesh 11 as illustrated in FIG. 3. For shipping, the grooved sheets can be laid out flat and stacked and only after arrival at their destination prior to use do they have to be folded to form the desired container or package.

Figure 5:
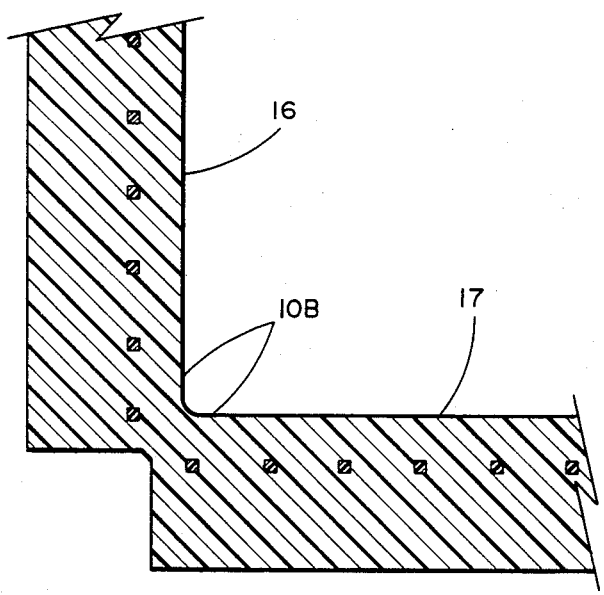
FIG. 5 illustrates the two hingedly joined sections of FIG. 3 folded to form walls of a package.
Figure 4:
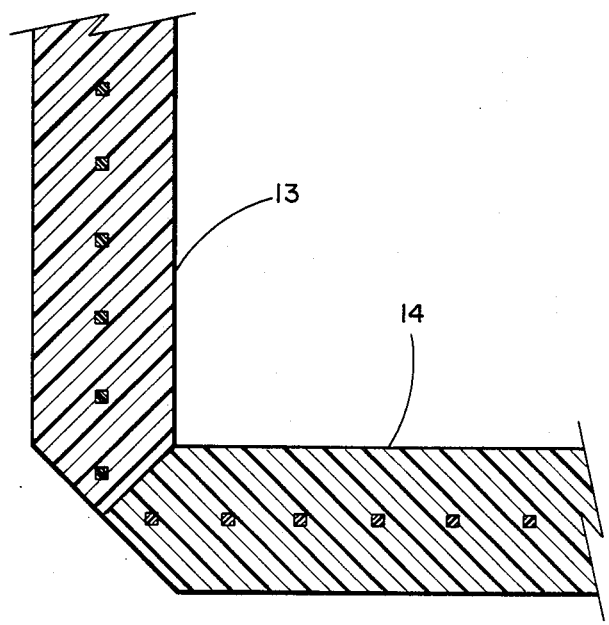
FIG. 4 shows the two hingedly joined sections of FIG. 2 bent with respect to one another to form walls of a package.

Alternatively, the relatively stiff foam board can be made foldable in the manner illustrated in FIGS. 3 and 5. The plastic mesh 11 is embedded in the foam plastic closer to the lower surface than the upper surface. A cutline or groove 15 is made either during molding or by a suitable cutting tool after molding in the upper section 10A of the plastic board down to the mesh 11. The uncut lower section 10B is now thin enough so that it has some degree of flexibility so that the two sections 16 and 17 can now be folded along slot 15 in the manner illustrated in FIG. 5 and the bottom portion 10B forms a fillet at the corner junction of sections 16 and 17. The location of mesh 11 is determined by the type of material forming the plastic sheet and can be set and controlled to stay in place at this location during the molding process using well-known molding techniques.

Figure 6:
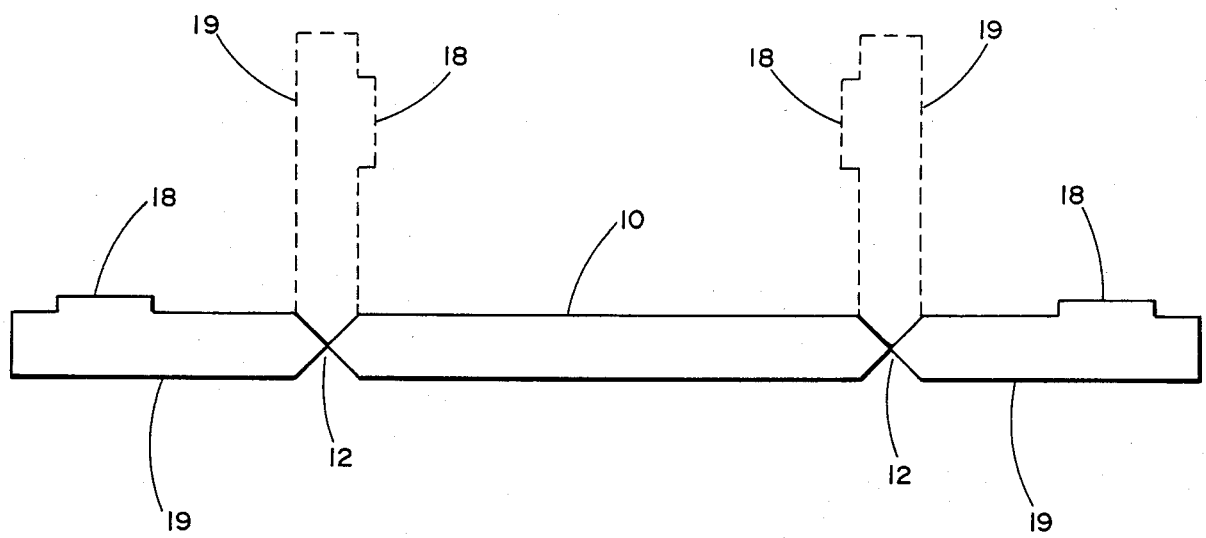
FIG. 6 illustrates a packaging product made according to the teachings of this invention.

FIG. 6 illustrates a particularly advantageous feature of the invention. As an example, the base sheet 10 is molded with a substantially flat upper and lower surface except for upwardly protruding bosses 18 which are needed to hold in place the article which is to be packaged up. The sheet with the bosses can be molded flat as shown in heavy lines in FIG. 6 so the molding process is not any more costly than it would be for a smooth surfaced article. After the grooves 12 are appropriately formed in the base 10 the separate outer sections 19 can be folded 90° upward, as illustrated in dashed line, to form the walls of a container in which the bosses 18 are appropriately located to hold a particularly shaped article in place within the package.

Figure 7:
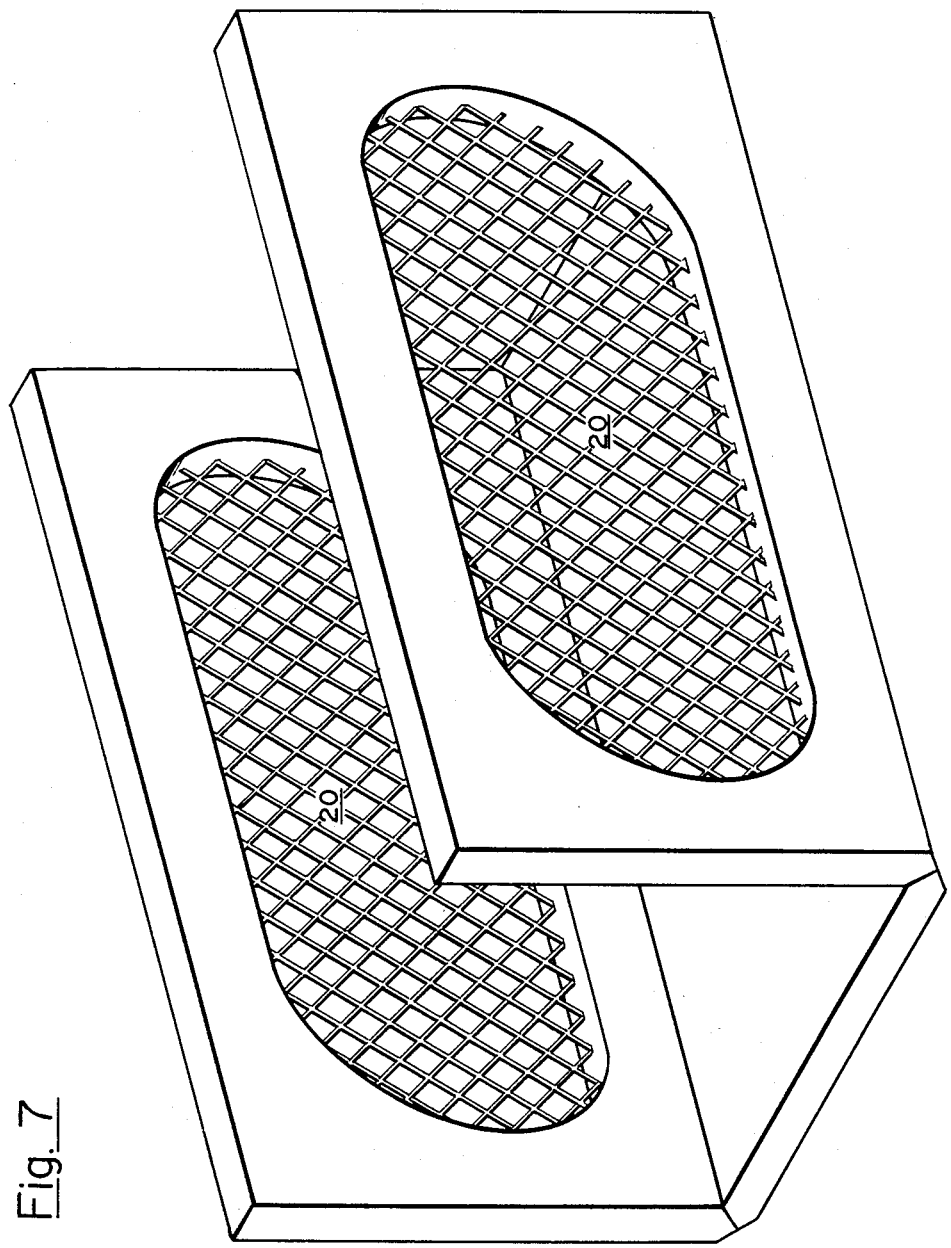
FIG. 7 illustrates a container made according to the teachings of the invention having a see-through opening for viewing the contents of the container.

FIG. 7 illustrates a three sided package (three sides were selected only for purposes of illustration) which is initially molded and formed in accordance with the teachings of the invention as described earlier. In this instance, however, in the areas generally designated by reference numeral 20 in each of the two side panels the plastic has been eliminated thereby providing a see-through opening in these two sidewalls so that the contents of the package can be observed through the openings in mesh 11. This is done without the package losing its ability to hold its contents in place. The opening can be formed either during the molding process or the plastic can be removed later using any conventional means.

As a feature of the invention, it has been found that the embedded mesh 11 also serves to reinforce the plastic so that it is less likely to crack or break or fragment if subjected to undue stress. Even if the plastic cracks the mesh tends to hold the pieces together.

Mesh 11 is preferably made of a suitable plastic but the material must be such so that it does not change substantially when subjected to the temperatures and pressures used in the molding process. Mesh 11 can be made from other materials such as metals but must have enough flexibility to be folded or bent along the grooves to provide the hinging effect.

Although EPS is mentioned as being preferred, one can use liquid plastic material which will flow through the openings in the mesh and be fused together during the molding process. It is also possible that the molding can be done by extrusion whereby the component parts are brought together and the plastic material fused through the mesh openings. Typically, a suitable EPS is a material identified as Arco Chemical D-195B and a suitable plastic mesh is identified as Conwed No. XV-4680.

In addition to its characteristics which make it useful for packaging or for insulated containers, foam plastic is quite buoyant so an article made in accordance with the teachings of this invention can be utilized as a float having a number of hingedly attached sections formed as described hereinabove which would undulate with the waves on water.

While in the illustrations mesh 11 is shown located about half way between the top and bottom surfaces of the base plastic, in some instances it may be preferable to have the mesh located closer to one of the surfaces as described earlier.

Although layer 11 is referred to as mesh, there is no intent to limit it to material which is only known as "mesh". Other perforated materials can be used provided they have the necessary characteristics, such as having openings through which the plastic material can be fused, having at least some degree of flexibility so that it can be bent along the slots or grooves, not reacting adversely with the plastic sheet material and not being subject to major alteration during molding or cutting.

Although the invention described showing a single hinging mesh embedded in the plastic material multiple additional mesh layers can be utilized. Also, the mesh need not be continuous throughout the molded sheet. Mesh need only be present where the slots or grooves are formed to provide the hinging effect.

I claim:

1. A product of the nature described, comprising:
a sheet of molded plastic material of substantial thickness having top and bottom surfaces with a thin sheet of mesh embedded in said sheet between said top and bottom surfaces with the plastic material fused together through and substantially filling the mesh openings for tenaciously holding together the mesh and plastic material; and elongated cutline extending from at least one surface through the sheet to the mesh forming the sheet into hingedly attached separate sections.

2. The invention as described in claim 1 further including a boss molded on at least one of the surfaces of the sheet.

3. The invention of claim 1 wherein said sheet is opaque with some of the plastic eliminated from overlying areas on both sides of the mesh to provide a see-through opening.

4. The invention of claim 1 wherein the plastic material is beaded and the mesh openings and bead sizes are such that the beads pass through and substantially fill the mesh openings when molded.

5. The invention of claim 1 wherein the plastic material is liquid which passes through and substantially fills the mesh openings when molded.

6. The invention of claim 4 wherein the mesh is a plastic material which remains substantially unaltered when molded into the sheet.

7. The invention as described in claim 1 wherein the cutline extends through the sheet from both surfaces to the mesh.

8. A method for making a product of the nature described, comprising the steps of:
a. embedding a thin flat mesh between surfaces of a plastic sheet by molding the plastic sheet so that the plastic fuses together to a substantial thickness through the mesh openings; and
b. forming the plastic sheet into separate sections hingedly attached to one another by making an elongated groove through the plastic to the web.

9. The method as described in claim 8 wherein the plastic is beaded and the beads flow through the mesh openings when molded.

10. The invention as described in claim 8 wherein the plastic material is liquid and flows through the mesh openings and is molded firm.

11. The invention as described in claim 8 further including the step of forming a see-through opening by eliminating some of the molded plastic on each side of the mesh in overlaying areas.

12. The invention as in claim 8 wherein in step b. overlaying elongated grooves are made through the sheet from opposite surfaces to the mesh.

13. A process for making a product of the nature described comprising the steps of:
a. placing moldable plastic material on each side of a flexible thin flat mesh;
b. molding the combined mesh and plastic material into a rigid flat sheet having plastic on each side of the mesh fused together through the mesh openings; and
c. forming an elongated groove through the plastic sheet from a surface of the sheet to the mesh to produce separate sections hingedly attached together by the mesh.

14. The process as described in claim 13 wherein in step (c) overlaying elongated grooves are formed through the plastic sheet to the mesh from each surface of the sheet.

* * * * *